United States Patent [19]
Hideshima et al.

[11] Patent Number: 5,710,840
[45] Date of Patent: Jan. 20, 1998

[54] IMAGE PROCESSING METHOD AND APPARATUS FOR ADJUSTING THE TONE DENSITY OF PIXELS BASED UPON DIFFERENCES BETWEEN THE TONE DENSITY OF A CENTER PIXEL AND TONE DENSITIES OF PERIPHERAL PIXELS

[75] Inventors: Takahiro Hideshima; Ushio Anayama, both of Kanagawa, Japan

[73] Assignee: Fuji Photo Film Co., Ltd., Kanagawa, Japan

[21] Appl. No.: 468,226

[22] Filed: Jun. 6, 1995

Related U.S. Application Data

[63] Continuation of Ser. No. 233,782, Apr. 26, 1994, abandoned.

[30] Foreign Application Priority Data

Apr. 26, 1993 [JP] Japan ................................. 5-120337

[51] Int. Cl.$^6$ ................................................ G06K 9/40
[52] U.S. Cl. ........................ 382/266; 382/268; 382/254
[58] Field of Search ................................. 382/266, 270, 382/274, 288, 268, 269; 358/429, 455, 456, 458, 448, 447

[56] References Cited

U.S. PATENT DOCUMENTS

| | | | |
|---|---|---|---|
| 4,571,635 | 2/1986 | Mahmoodi et al. | 382/266 |
| 4,903,138 | 2/1990 | Arakagaki | 358/261.3 |
| 4,941,190 | 7/1990 | Joyce | 382/54 |
| 5,189,529 | 2/1993 | Ishiwata et al. | 358/448 |
| 5,390,264 | 2/1995 | Ishihara et al. | 382/54 |

*Primary Examiner*—Leo Boudreau
*Assistant Examiner*—Matthew C. Bella
*Attorney, Agent, or Firm*—Sughrue, Mion, Zinn, Macpeak & Seas, PLLC

[57] ABSTRACT

An image processing method and apparatus capable of sufficiently emphasizing binary density image area without deterioration of the image quality of a gray-scale or middle tone image area. During image processing, a density $A_0$ of a center pixel is converted into a density $[A]_0$ by the formula;

$$[A]_0 = A_0 + K_1 \times (\Sigma(A_0 - A_i)) + K_2) \times \Sigma(A_0 - A_i)$$

wherein $A_i$ is a density of peripheral pixels surrounding the center pixel and $K_1$ and $K_2$ are constants, respectively.

22 Claims, 3 Drawing Sheets

| $A_1$ | $A_2$ | $A_3$ |
|---|---|---|
| $A_4$ | $A_0$ | $A_5$ |
| $A_6$ | $A_7$ | $A_8$ |

| $A_1$ | | $A_2$ | | $A_3$ |
|---|---|---|---|---|
| | | | | |
| $A_4$ | | $A_0$ | | $A_5$ |
| | | | | |
| $A_6$ | | $A_7$ | | $A_8$ |

# IMAGE PROCESSING METHOD AND APPARATUS FOR ADJUSTING THE TONE DENSITY OF PIXELS BASED UPON DIFFERENCES BETWEEN THE TONE DENSITY OF A CENTER PIXEL AND TONE DENSITIES OF PERIPHERAL PIXELS

This is a Continuation of Application No. 08/233,782 filed Apr. 26, 1994, now abandoned.

BACKGROUND OF THE INVENTION

1. Field of the Invention

The present invention relates to an image processing method for emphasizing an image including a middle tone density area represented by a multinarized tone graduation.

2. Prior Art Statement

In some system of the prior image processing method, an image is read by an image sensor such as a CCD line sensor or a CCD area sensor, and data of read image is output after image processings such as edge sharpening (contour emphasizing), smoothing, compressing and/or level shifting.

In this case, image emphasizing generally means emphasizing of the image edge by enhancing a high frequency component of the image signal through a filter using a linear differential or a Laplacian (quadratic differential) such as, for example, unsharp masking filter.

On the other hand, some original prints or documents may include a middle tone or gray-scale area, for example, photographic image area. In the case where an original document to be read includes both of a middle tone (gray-scale) area and a binary density area consisting of black and white picture element such as a character script, there has been raised a problem that the middle tone graduation area is unnaturally emphasized and a fine image cannot be obtained, if the conventional high frequency component enhancing filter is used.

OBJECT AND SUMMARY OF THE INVENTION

An object of the present invention made in view of the above-described problem is to provide an image processing method which enables to sufficiently emphasize the binary density area without deterioration of the image quality of the middle tone area.

According to the present invention, this object is attained by the provision of an image processing method for emphasizing an image including a middle tone density area, the middle tone area being represented by multinarized tone graduation, wherein a density $A_0$ of a center pixel is converted to a density $[A]_0$ by a formula given below with assumption of a density of peripheral pixels surrounding the center, pixel as $A_i$ and constants as $K_1$ and $K_2$ respectively:

$$[A]_0 = A_0 + K_1 \times (\Sigma(A_0 - A_i)) - K_2 \times \Sigma(A_0 - A_i).$$

In the above formula, constants $K_1$ and $K_2$ may be obtained as optimum values from experiments. If, for example, an image projected on a screen is scanned in a scanning resolution of approximately 16 dots/mm and the density level or scale of the image is read in 256 tonal range, the constants should preferably be set to $K_1=1/256$ and $K_2=16$. Peripheral pixels can be determined by a 3×3 matrix including the center pixel. In a 5×5 matrix, however, those pixels apart as much as one pixel away from the center pixel in the main scanning direction and the subsidiary scanning direction can be determined as peripheral pixels.

DESCRIPTION OF PREFERRED EMBODIMENTS

Figure 1:
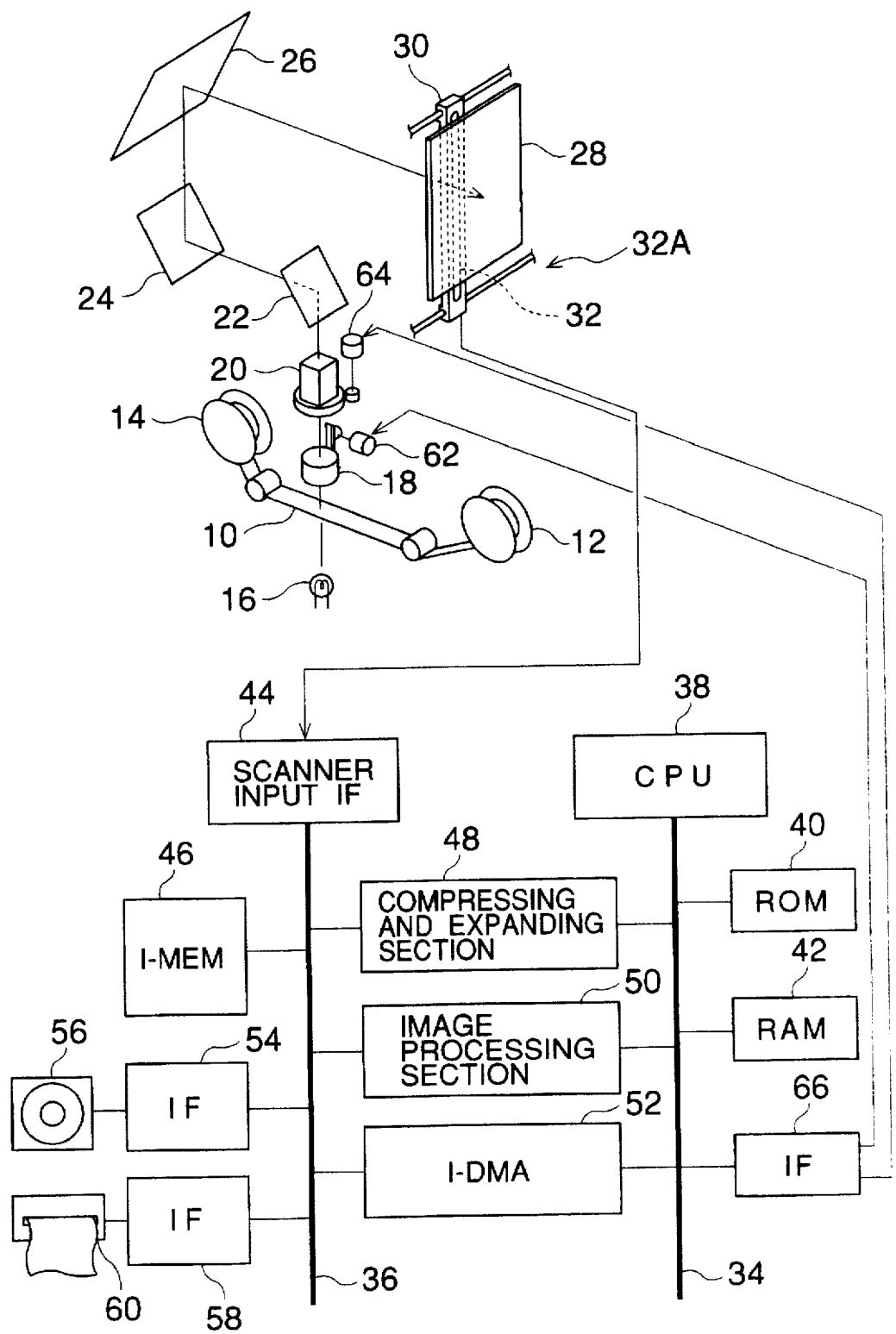
FIG. 1 is a schematic illustration showing a microfilm reader assembled in an embodiment of the present invention, wherein some parts thereof are shown in a simplified fashion and the other parts are shown in the form of a block diagram.

Initially referring to FIG. 1, the construction of the system will be described. Reference numeral 10 in FIG. 1 designates a microfilm which is taken up from one to the other of two reels 12, 14. Light from a light source 16 positioned below the microfilm 10 passes through the film 10, and then passes through a projection lens 18, an image-rotating prism 20, and reflecting mirrors 22, 24, 26 to the rear surface of a screen 28.

A movable plate 30 movable in the horizontal plane is disposed with an elongated rear side of the screen 28, and is extending along the vertical plane, and a CCD line sensor 32 is mounted on the movable plate 30 in the vertical direction thereof. The movable plate 30 having line sensor 32 is horizontally moved by a motor 33. These movable plate 30 and line sensor 32 constitute a scanner 32A. With this construction, the image projected onto the screen 28 can be read by reading the portions of image incident on the line sensor 32, while moving the movable plate 30 along the horizontal plane.

As shown in FIG. 1, the system of the present embodiment has two data transfer buses 34 and 36, one bus 34 for a CPU and another bus 36 for image data. The CPU bus 34 is connected to the CPU (central processing chip) 38, ROM 40 and RAM 42. Image data read by the line sensor 32 are converted into digital signals which are transferred to various sections through a scanner input interface (IF) 44 and the image data bus 36.

Reference numeral 46 denotes a memory for image data (hereafter referred to as "I-MEM"), a semiconductor memory device which can be written and read at high speed.

Reference numeral 48 designates a compressing and expanding section which is connected to both buses 34, 36. This image compressing and expanding section 48 compresses the read image data, for instance, prior to transfer the same to an external terminal unit such as a facsimile machine or a microfilm reader, or expands to restore the data which have been transferred from an external terminal unit in the compressed state.

Reference numeral 50 designates an image processing section which is connected to both buses 34, 36. Based on unprocessed original read data, this image processing section 50 effects image emphasizing thereof and various spatial filtering processing, such as thinning or dithering. This image emphasizing processing will be described in detail hereinafter.

Reference numeral 52 designates a control section for controlling data transfer (I-DMA; Image Direct Memory Access), and controls the transfers of data between various memories and various input or output interface or the direct transfer of data between a memory and another memory. In this embodiment, transfer of image data is effected through the DMA system where image data is transferred without passing through the CPU 38. Thus the CPU 38 does not need to perform any processing until the completion of the data transfer after the required parameters including the memory address for initiating transfer and the time of transfers are set on the I-DMA control section 52.

Reference numeral 54 designates a disc input/output interface which is interposed between the bus 36 and an external memory unit 56 such as an optical disc. Reference numeral 58 designates a printer output interface which is interposed between a printer 60 and the bus 36.

The focus of the projection lens 18 can be adjusted by the motor 62. The image rotating prism 20 can be rotated by the motor 64 and these serve an image rotating means. These motor 62 and 64 are controlled and actuated by instructions from the CPU 38 through the interface 66 and the drive circuit (not shown).

Figure 4:
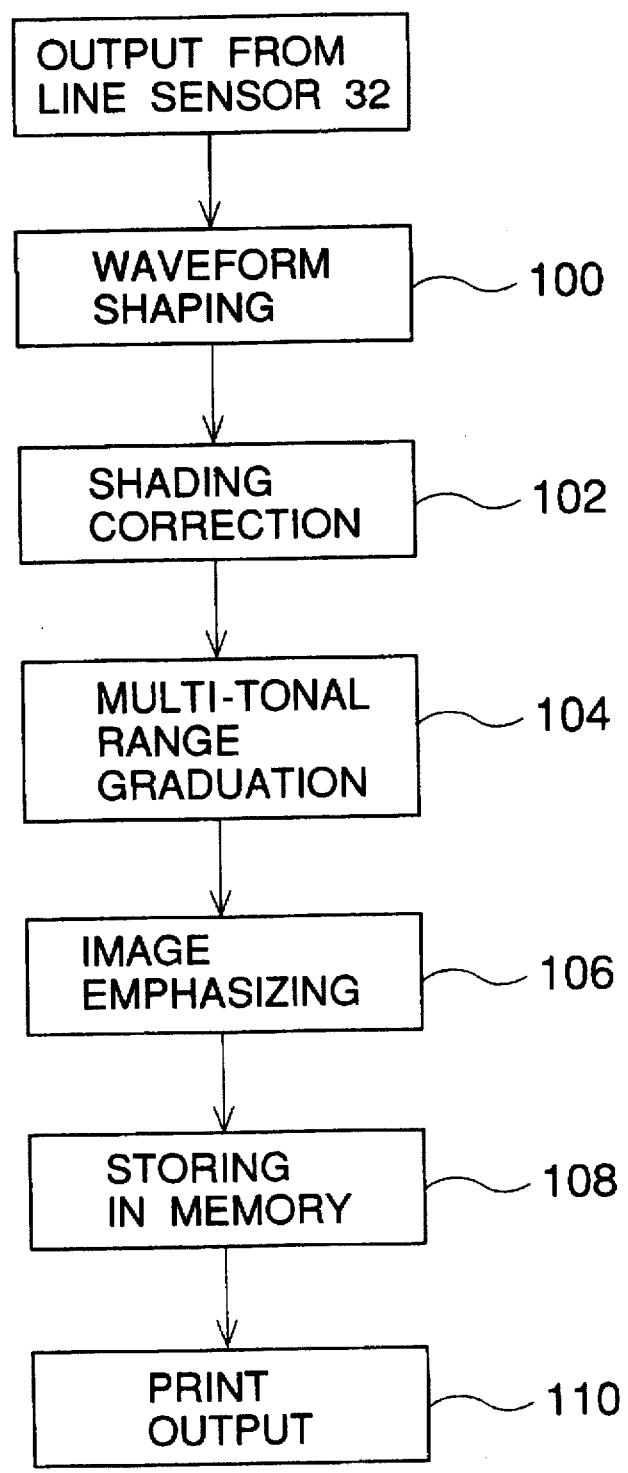
FIG. 4 is a block diagram showing an example of the operation sequence of the embodiment of the present invention.

The CPU 38 performs a series of selected operations under the instructions of the corresponding operation program stored in and selected from the ROM 40. In details, the CPU 38 effects shaping the waveforms of output signals from the line sensor 32 (step 100 in FIG. 4), correcting irregularity of output levels (shading correction; step 102) due to unevenness of illumination and irregularity of characteristics of pixels on the line sensor 32, and then carries out image processing through the image processing section 50.

Figures 2A, 2B, 3:
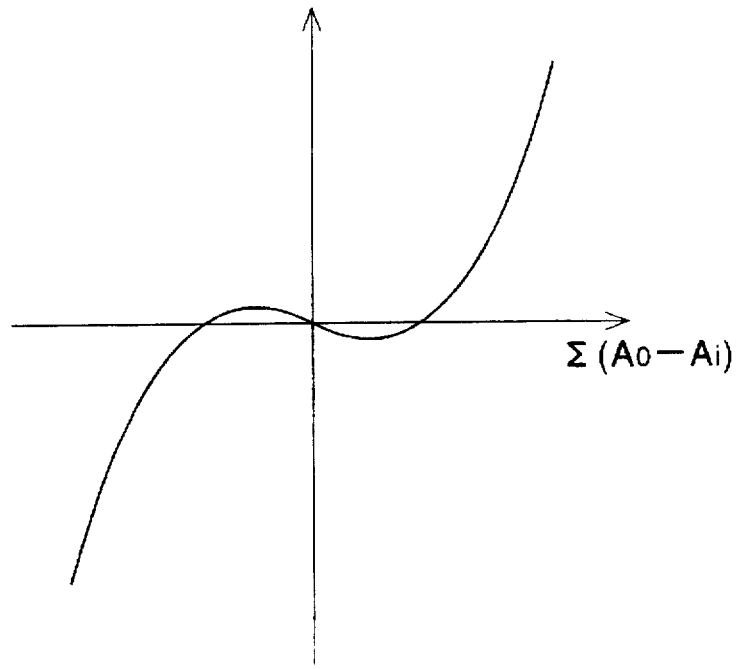
FIGS. 2A and 2B are respectively an example of arrangement of peripheral pixels.
FIG. 3 is a graphic representation of a conversion characteristic of function B.

This image processing section 50 converts the image data signal into a digital density signal having a certain tone or graduation (for example, the tone being one of 256 scale density graduation) (step 104), and then subject thus scale adjusted image to image emphasizing processing (step 106). This image emphasizing process is carried out as described below. While directing an attention to a certain pixel $A_0$ (referred to as the center pixel), eight pixels $A_1$ to $A_8$ (referred to as the peripheral pixels) surrounding the center pixel $A_0$ are determined as shown in FIGS. 2A and 2B. In FIG. 2A, the 3×3 pixel matrix is used and eight pixels $A_1$ to $A_8$ surrounding the center pixel $A_0$ are defined as the peripheral pixels. As seen in FIG. 2B, alternatively, the 5×5 matrix is used and eight pixels $A_1$ to $A_8$ on an outer periphery apart as much as one pixel away from the center pixel $A_0$ in the main and subsidiary scanning directions are defined as peripheral pixels.

Now representing the tone densities of the pixels $A_0$ and $A_1$ to $A_8$ as $A_0$ and $A_1$ to $A_8$ respectively, the density of the center pixel $A_0$ is converted by the formula given below, where $[A]_0$ is the density of the center pixel after conversion and $K_1$ and $K_2$ are constants obtained from the experiments.

$$[A]_0 = A_0 + K_1 \times B = A_0 + K_1 \times (\Sigma(A_0 - A_i) - K_2) \times \Sigma(A_0 - A_i) \quad (1)$$

In this formula (1), B is a quadratic function with $\Sigma(A_0 - A_i)$ as a variable, which has a characteristic as shown in FIG. 3. Value $\Sigma(A_0 - A_i)$ is a total sum of $(A_0 - A_1)$, $(A_0 - A_2)$ to $(A_0 - A_8)$. As a result, the function B represents an emphasized component which depends on a density difference between the center pixel $A_0$ and peripheral pixels.

It was clarified from the results of experiments that, when the line sensor 32 reads the image projected onto the screen 28 in the scanning resolution of 16 dots per millimeter and the tonal range of respective pixels in 256 graduation scales, it is preferable to set constants $K_1$ and $K_2$ respectively to $K_1 = 1/256$ and $K_2 = 16$. In other words, in a case that an image is projected on the screen 28 in a size suitable for operator's recognition and thus projected image is read by the above described resolution and tonal range, the constants $K_1$ and $K_2$ should be set as the above-mentioned value for convenient.

The character image portion of the read image which is expressed by binary monochromatic values (i.e., black and white pixels without graduation or half tone) has a large differential density between the center pixel $A_0$ and the peripheral pixels $A_i$, resulting in a large value of $|\Sigma(A_0 - A_i)|$.

According to the density conversion with the formula (1), therefore, the value of B becomes large and the character image is sufficiently emphasized or edge-sharpened. On the other hand, a photographic image region, in which a gray or half tone is prominent, has a relatively small differential density between the center pixel $A_0$ and the peripheral pixels $A_i$. As a result $|\Sigma(A_0 - A_i)|$ also becomes small. Therefore, the value of B is extremely small as known from FIG. 3. Accordingly, image emphasizing is rarely carried out for gray-scale or middle tone images.

Thus image data subjected to thus image-emphasizing are stored in the I-MEM 46 (step 108) and printed out as required (step 110) after appropriate image processing is added. These image data are stored in an external memory unit 56 or transferred to an external unit.

As should be appreciated from the foregoing, since the density $A_0$, of the center pixel converted into the density $[A]_0$ by using formula (1), slight image-emphasizing is effected to the gray-scale or middle tone image area while sufficient image emphasizing is effected to the binary monochrome density image area. Accordingly, image emphasizing can be sufficiently carried out without any deterioration of the image quality of the gray-scale or half tone image area.

In this case, for reading the screen projection image in the scanning resolution of approximately 16 dots/mm and converting the density in 256 scales, it is preferable to set constants $K_1$ and $K_2$ to $K_1 = 1/256$ and $K_2 = 16$, respectively. The peripheral pixels $A_i$ may be, of course, set with eight pixels $A_1$ to $A_8$ of the 3×3 pixel matrix and surrounding the center pixel $A_0$. Alternatively, eight pixels located on the outer periphery apart as much as one pixel from the center pixel of the 5×5 matrix can be used as the peripheral pixel $A_i$.

While the present invention has been illustrated and described in connection with the preferred embodiments, it is not to be limited to the specific construction shown. It should be understood by those skilled in the art that various changes and modifications may be made without departing from the spirit and scope of the present invention as defined in the appended claims.

What is claimed is:

1. A computer-implemented image processing method for emphasizing an image, including a middle tone density area and a binary density area consisting of black and white picture elements, comprising the steps of:

sensing said image with a sensor to form a plurality of pixels, each of said pixels having a tone density;

designating a center pixel and a plurality of peripheral pixels;

determining a sum of differences between the tone density $A_0$ of said center pixel and the tone density $A_i$ of each of said peripheral pixels;

adjusting the tone density $A_0$ of said center pixel based upon a quadratic function of said sum to produce an adjusted tone density $A_0'$, such that said image is edge-sharpened in said binary density area without deterioration of the image quality of said image in said middle tone density area; and outputting the adjusted tone density signal.

2. The image processing method according to claim 1, wherein the adjusted tone density $A_0'$ is produced according to the following equation:

$$A_0'=A_0+K_1\times(|\Sigma(A_0-A_i)|-K_2)\times\Sigma(A_0-A_i)$$

where $K_1$ and $K_2$ are constants.

3. The image processing method according to claim 2, wherein $K_1=1/256$ and $K_2=16$.

4. The image processing method according to claim 1, wherein said peripheral pixels comprise eight pixels which are directly adjacent to said center pixel.

5. The image processing method according to claim 2, wherein said peripheral pixels comprise eight pixels which are directly adjacent to said center pixel.

6. The image processing method according to claim 3, wherein said peripheral pixels comprise eight pixels which are directly adjacent to said center pixel.

7. The image processing method according to claim 1, wherein said peripheral pixels comprise eight pixels which are no further than one pixel in distance away from said center pixel in main and subsidiary scanning directions.

8. The image processing method according to claim 2, wherein said peripheral pixels comprise eight pixels which are no further than one pixel in distance away from said center pixel in main and subsidiary scanning directions.

9. The image processing method according to claim 3, wherein said peripheral pixels comprise eight pixels which are no further than one pixel in distance away from said center pixel in main and subsidiary scanning directions.

10. The image processing method according to claim 1, wherein said pixels are stored as digital density signals which represent the tone densities of said pixels by multinarized tone graduation.

11. The image processing method according to claim 1, wherein said peripheral pixels are non-adjacent to said center pixel.

12. An apparatus for emphasizing an image including a middle tone density area and a binary density area consisting of black and whim picture elements, comprising:

an image sensor for sensing the image and forming image data consisting of a plurality of pixels each having a tone density;

storing means for storing said pixels; and processing means for designating a center pixel and a plurality of peripheral pixels, for determining a sum of differences between the tone density $A_0$ of said center pixel and the tone density $A_i$ of each of said peripheral pixels, and for adjusting the tone density $A_0$ of said center pixel based upon a quadratic function of said sum to produce an adjusted tone density $A_0'$, such that said processing means edge-sharpens said image in said binary density area without deterioration of the image quality in said middle tone density area.

13. The apparatus according to claim 12, wherein the adjusted tone density $A_0'$ is produced according to the following equation:

$$A_0'=A_0+K_1\times(|\Sigma(A_0-A_i)|-K_2)\times\Sigma(A_0-A_i)$$

where $K_1$ and $K_2$ are constants.

14. The apparatus according to claim 13, wherein $K_1=1/256$ and $K_2=16$.

15. The apparatus according to claim 12, wherein said peripheral pixels comprise eight pixels which are directly adjacent to said center pixel.

16. The apparatus according to claim 13, wherein said peripheral pixels comprise eight pixels which are directly adjacent to said center pixel.

17. The apparatus according to claim 14, wherein said peripheral pixels comprise eight pixels which are directly adjacent to said center pixel.

18. The apparatus according to claim 12, wherein said peripheral pixels comprise eight pixels which are no further than one pixel in distance away from said center pixel in main and subsidiary scanning directions.

19. The apparatus according to claim 13, wherein said peripheral pixels comprise eight pixels which are no further than one pixel in distance away from said center pixel in main and subsidiary scanning directions.

20. The apparatus according to claim 14, wherein said peripheral pixels comprise eight pixels which are no further than one pixel in distance away from said center pixel in main and subsidiary scanning directions.

21. The apparatus according to claim 12, wherein said storage means stores said pixels as digital density signals which represent the tone densities of said pixels by multinarized tone graduation.

22. The apparatus according to claim 12, wherein said peripheral pixels are non-adjacent to said center pixel.

* * * * *